US008354620B2

(12) United States Patent
Frock et al.

(10) Patent No.: US 8,354,620 B2
(45) Date of Patent: Jan. 15, 2013

(54) STEAM OVEN HEATER PLATE ARRANGEMENT

(75) Inventors: Jeffrey L. Frock, Troy, OH (US); Atul Saksena, Troy, OH (US); Timothy L. Cupp, Hillsboro, OH (US)

(73) Assignee: Premark FEG L.L.C., Glenview, IL (US)

( * ) Notice: Subject to any disclaimer, the term of this patent is extended or adjusted under 35 U.S.C. 154(b) by 289 days.

(21) Appl. No.: 12/868,390

(22) Filed: Aug. 25, 2010

(65) Prior Publication Data

US 2011/0049123 A1   Mar. 3, 2011

Related U.S. Application Data

(60) Provisional application No. 61/237,099, filed on Aug. 26, 2009.

(51) Int. Cl.
   *H05B 3/02* (2006.01)
(52) U.S. Cl. .................. 219/393; 219/391; 219/539
(58) Field of Classification Search .................. 219/393, 219/391, 539
   See application file for complete search history.

(56) References Cited

U.S. PATENT DOCUMENTS

| | | | | | |
|---|---|---|---|---|---|
| 1,664,324 | A | * | 3/1928 | Schell | 126/374.1 |
| 2,942,562 | A | * | 6/1960 | Luc | 426/27 |
| 2,955,186 | A | * | 10/1960 | Ritter | 219/489 |
| 3,364,844 | A | * | 1/1968 | Felske | 99/331 |
| 3,493,723 | A | * | 2/1970 | Popeil | 392/336 |
| 3,521,032 | A | * | 7/1970 | Valentin | 219/400 |
| 3,610,133 | A | * | 10/1971 | Mies, Jr. et al. | 99/337 |
| 4,301,717 | A | * | 11/1981 | Knees | 99/348 |
| 4,509,412 | A | * | 4/1985 | Whittenburg et al. | 99/331 |
| 4,729,296 | A | * | 3/1988 | Sabin | 99/349 |
| 5,553,531 | A | * | 9/1996 | Brown | 99/340 |
| 5,865,101 | A | * | 2/1999 | Brown | 99/340 |
| 5,964,145 | A | * | 10/1999 | Brown | 99/422 |
| 6,582,743 | B2 | * | 6/2003 | Cai | 426/510 |
| 6,602,530 | B1 | * | 8/2003 | Weber et al. | 426/233 |
| 7,412,922 | B2 | * | 8/2008 | McLemore | 99/413 |
| 7,853,130 | B2 | * | 12/2010 | Frock et al. | 392/441 |
| 2004/0226934 | A1 | * | 11/2004 | Moore et al. | 219/401 |
| 2005/0034611 | A1 | * | 2/2005 | McLemore | 99/413 |
| 2008/0008807 | A1 | * | 1/2008 | Frock et al. | 426/520 |

(Continued)

FOREIGN PATENT DOCUMENTS

DE       3718823       12/1988

(Continued)

OTHER PUBLICATIONS

PCT International Preliminary Report on Patentability (IPRP), International Application No. PCT/US2010/046737 (Aug. 3, 2012).
PCT, International Search Report and Written Opinion, International Application No. PCT/US2010/046737 (Feb. 18, 2011).

*Primary Examiner* — Laura Menz
(74) *Attorney, Agent, or Firm* — Thompson Hine LLP (57) ABSTRACT

A steam oven includes a cooking cavity for receiving food product and a water reservoir for receiving water to be heated to generate steam, the water reservoir defined in part by a bottom wall structure of the cooking cavity. A heater plate located adjacent the bottom wall structure delivers heat through the bottom wall structure to water in the water reservoir. A spring-loaded heater plate mount arrangement supports the heater plate adjacent the bottom wall structure while permitting some movement of the heater plate.

10 Claims, 8 Drawing Sheets

U.S. PATENT DOCUMENTS

2009/0087534 A1*  4/2009  McLemore .................. 426/523
2009/0095166 A1*  4/2009  Jian ............................... 99/330
2011/0049123 A1*  3/2011  Frock et al. .................. 219/393
2011/0303651 A1*  12/2011 Mineoka et al. ............. 219/432

FOREIGN PATENT DOCUMENTS

| | | |
|---|---|---|
| EP | 0211491 | 2/1987 |
| EP | 1898156 A1 * | 3/2008 |
| FR | 2628927 | 9/1989 |

* cited by examiner

STEAM OVEN HEATER PLATE ARRANGEMENT

CROSS-REFERENCES

This application claims the benefit of U.S. provisional application Ser. No. 61/237,099, filed Aug. 26, 2009, the entirety of which is incorporated herein by reference.

TECHNICAL FIELD

This application relates generally to cooking devices utilizing heater plates and, more specifically, to a steam oven and associated mounting arrangement for a heater plate.

BACKGROUND

U.S. Pat. No. 6,602,530 discloses a steam oven construction in which the oven chamber includes a lower water reservoir with an associated heating element for heating water in the reservoir to generate steam. One type of heating element useful in connection with such a configuration is a resistive heater plate, which is a plate structure with one or more resistive heating elements embedded therein. In the past such heater plates were mounted at the underside of the oven cavity (e.g., directly adjacent the exterior of the bottom of the water reservoir) using fixed studs and bolts. This configuration did not allow for the heater plate to readily expand and contract.

It would be desirable to provide a mounting arrangement for the heater plate that more readily accounts for and/or permits the heater plate to expand and contract.

SUMMARY

In one aspect, a steam oven includes a cooking cavity for receiving food product and a water reservoir for receiving water to be heated to generate steam, the water reservoir defined in part by a bottom wall structure of the cooking cavity. A heater plate located adjacent the bottom wall structure delivers heat through the bottom wall structure to water in the water reservoir. A spring-loaded heater plate mount arrangement supports the heater plate adjacent the bottom wall structure while permitting some movement of the heater plate.

In another aspect, an oven includes a cooking cavity for receiving food product and a heater plate adjacent a wall structure of the cooking cavity. A spring-loaded heater plate mount arrangement supports the heater plate. The spring-loaded heater plate mount arrangement includes at least one spring unit arranged for pivoting relative to the wall structure between an assembled position and a removal position. In the assembled position the spring unit urges the heater plate against the wall structure. In the removal position the spring unit is moved away from the wall structure to permit removal of the heater plate.

In a further aspect, a resistive heater includes a plate member having a plurality of resistive heating elements embedded therein, the plate member including an upper surface that is substantially planar and a bottom surface having a plurality of recesses formed therein. Each of the plurality of resistive heating elements has primary segments with lengthwise axes that extend substantially perpendicular to lengthwise axes of the recesses.

The details of one or more embodiments are set forth in the accompanying drawings and the description below. Other features, objects, and advantages will be apparent from the description and drawings, and from the claims.

DETAILED DESCRIPTION

Figure 1:
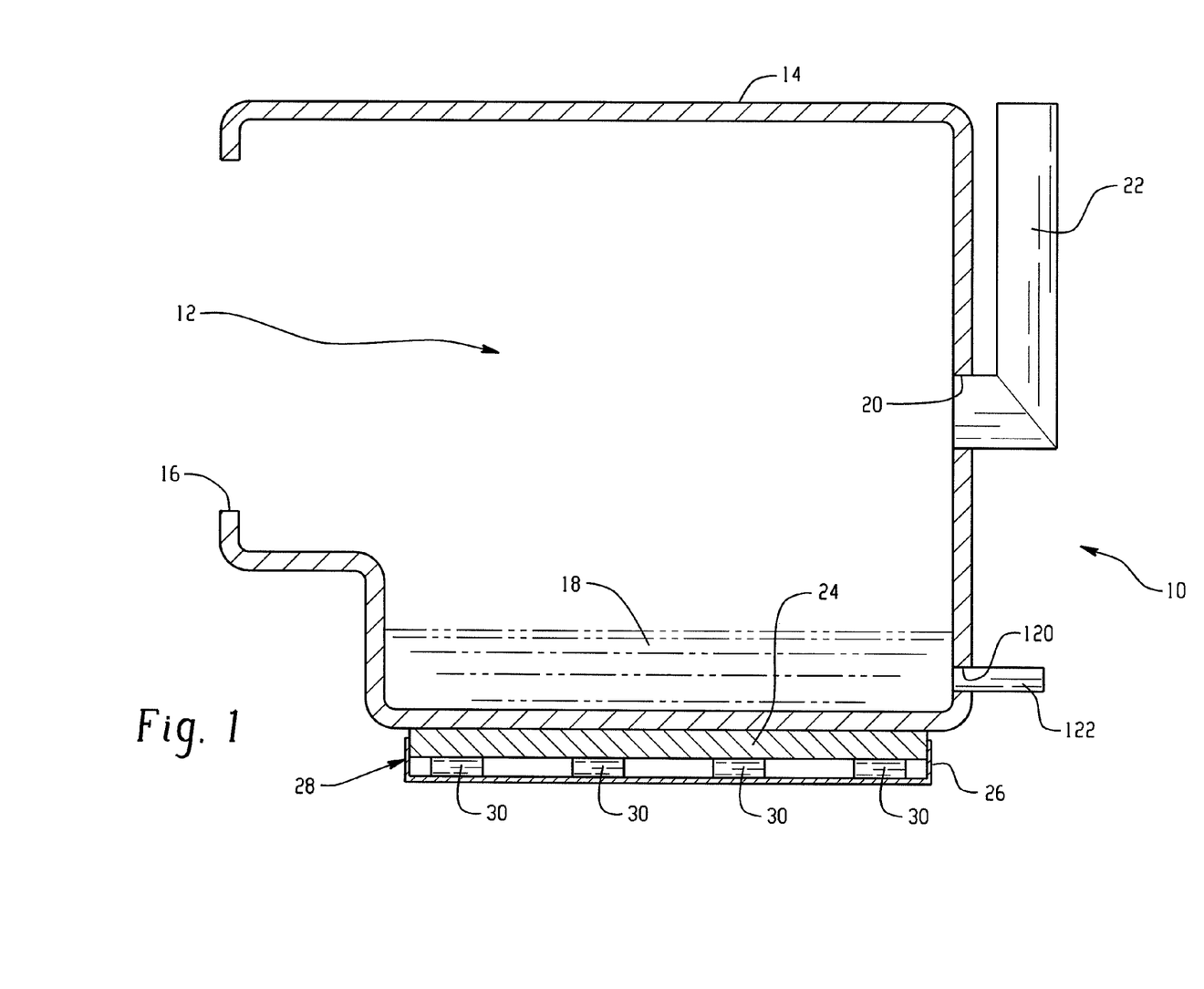
FIG. 1 is a schematic cross-section of a steam oven.

Referring to FIG. 1, a steam oven 10 includes a cooking cavity 12 for receiving food product. The cooking cavity 12 is formed by wall structures 14 (e.g., top wall, bottom wall, left side wall, right side wall and rear wall), such as stainless steel, with a front opening 16 through which food product can be passed and a door (not shown). A water reservoir 18 is located at the bottom of the cavity 12 for receiving water to be heated to generate steam. A steam exhaust opening 20 is provided in the rear wall (or other location) of the cavity and includes an associated steam vent pipe 22 and a drain outlet 120 and drain pipe 122. A temperature sensor may be located in the pipe 22 for detecting steam passage along the pipe and responsively controlling heating of water in the reservoir via energization of resistive heating elements in a heater plate 24. The heater plate 24 is positioned adjacent the bottom wall structure of the cavity for delivering heat through the bottom wall structure to water in the water reservoir 18.

A spring-loaded heater plate mount arrangement 26 supports the heater plate 24 adjacent the bottom wall structure while permitting some movement of the heater plate (e.g., during expansion and contraction of the heater plate). The spring-loaded heater plate mount arrangement 26 includes a tray member 28 having multiple spring units 30 positioned therein and engaged with the underside of the heater plate. The spring units 30 bias the heater plate upward into contact with the bottom wall structure of the cavity. In some cases, a thermally conductive grease material may be used between the upper surface of the heater plate and the bottom surface of the cavity bottom wall to provide a more effective heat transfer relationship from the plate to the bottom wall. As used herein, the terminology "heater plate adjacent the bottom wall structure" or " heater plate against the wall structure" encompasses a heater plate and wall structure arrangement in which such grease is located between the plate and the wall structure.

Figures 2, 3:
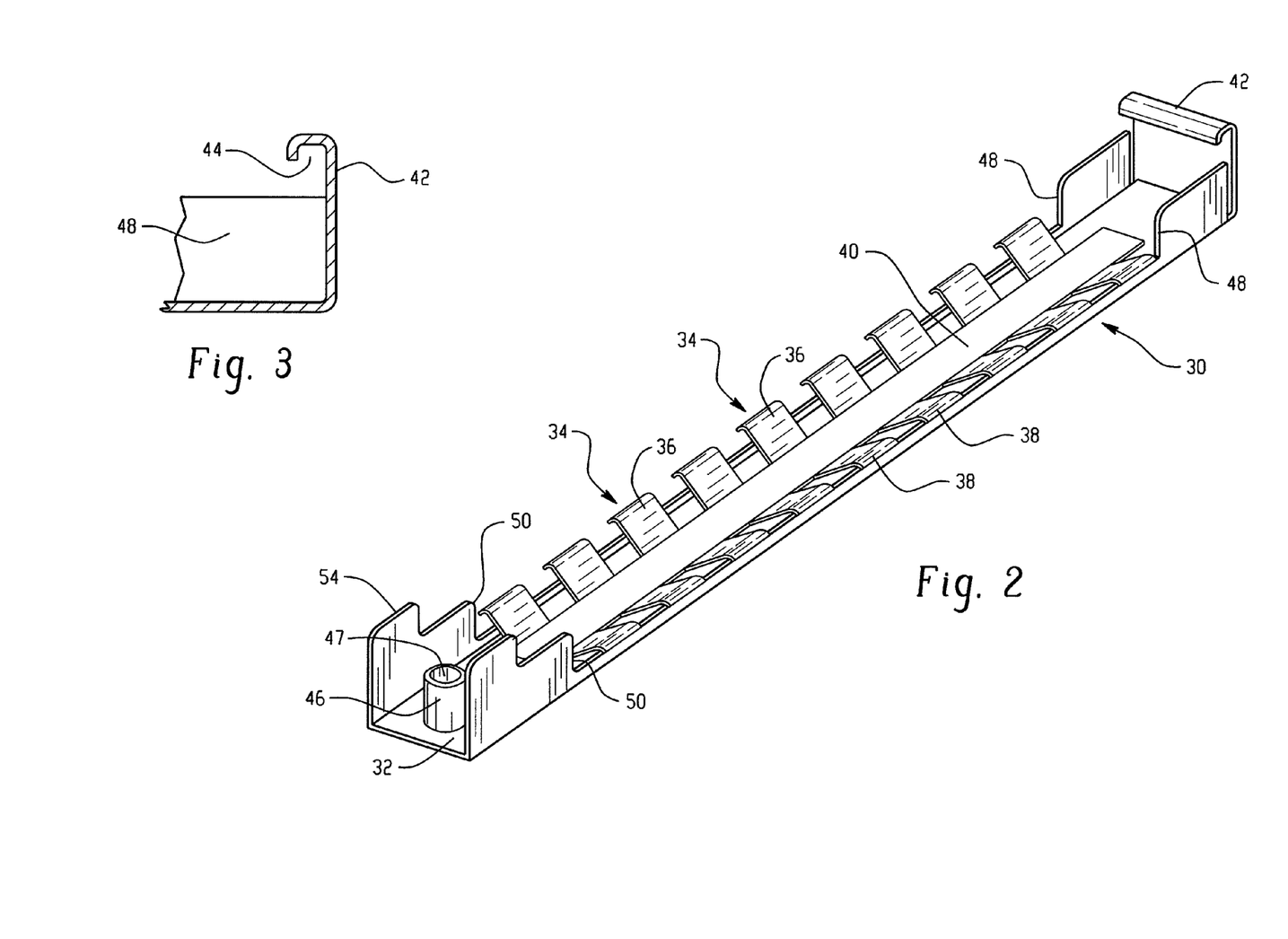
FIG. 2 is a perspective view of a spring unit.
FIG. 3 is a partial cross-section of one end of the spring unit of FIG. 2.

Referring to FIG. 2, in one embodiment each spring unit 30 is formed by an elongated channel member or bracket 32 with multiple leaf spring-type members 34 located therealong, each having spaced apart arms 36 and 38. The multiple spring members 34 of each channel member are connected to a common central rail or spine 40 that is positioned within the channel member. The spring members 34 and rail 40 may, by way of example, be formed as a monolithic structure from meal plate that is cut and formed. The rail 40 may be secured to the channel member 32 by pop-riveting or other suitable means. One end of the channel member 32 includes an upwardly extending mount arm 42 with an inverted channel 44 formed thereby for engaging with the oven cavity in a pivoting manner. The opposite end of the channel member 32 includes a boss 46 with a mount opening 47 for receiving a fastener. The end portions of the channel member also include edge stops 48 and 50 that act to position the heater plate.

Figure 4:
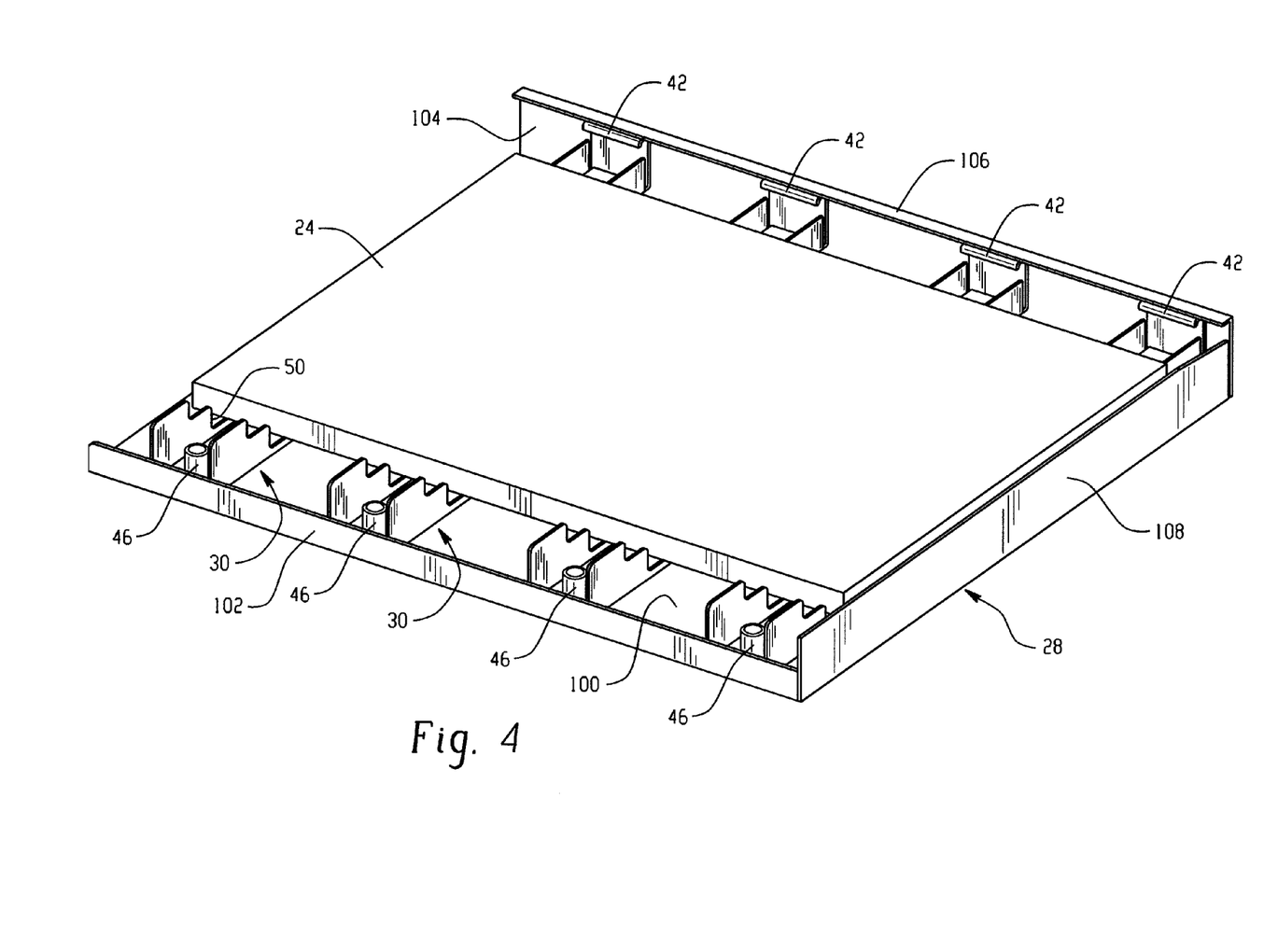
FIG. 4 is a perspective view of a heater plate mount tray assembly.
Figure 5:
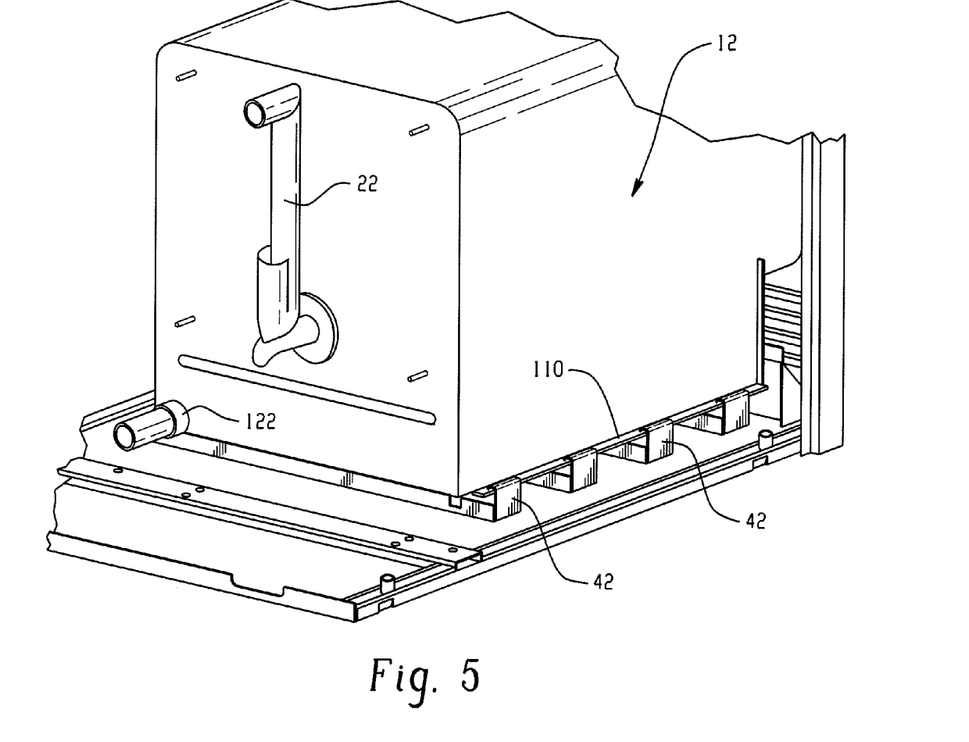
FIG. 5 is a partial perspective view of a portion (tray removed) of the heater plate mount arrangement pivotally arrange to the oven cavity.
Figure 6:
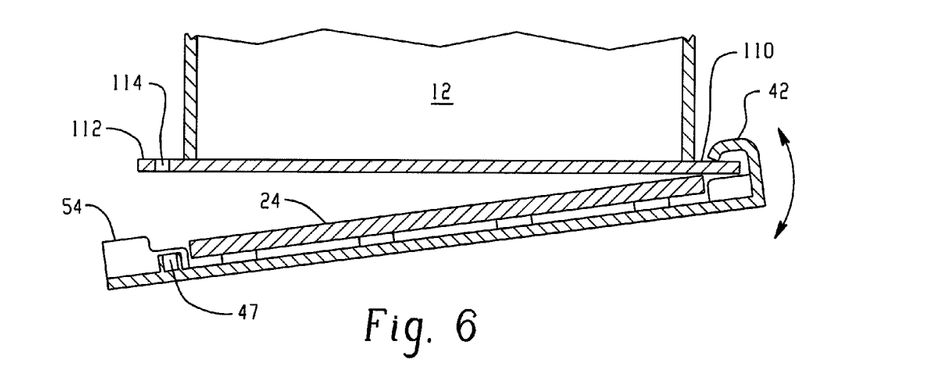
FIG. 6 is a partial cross-section of the heater plate mount arrangement.
Figure 7:
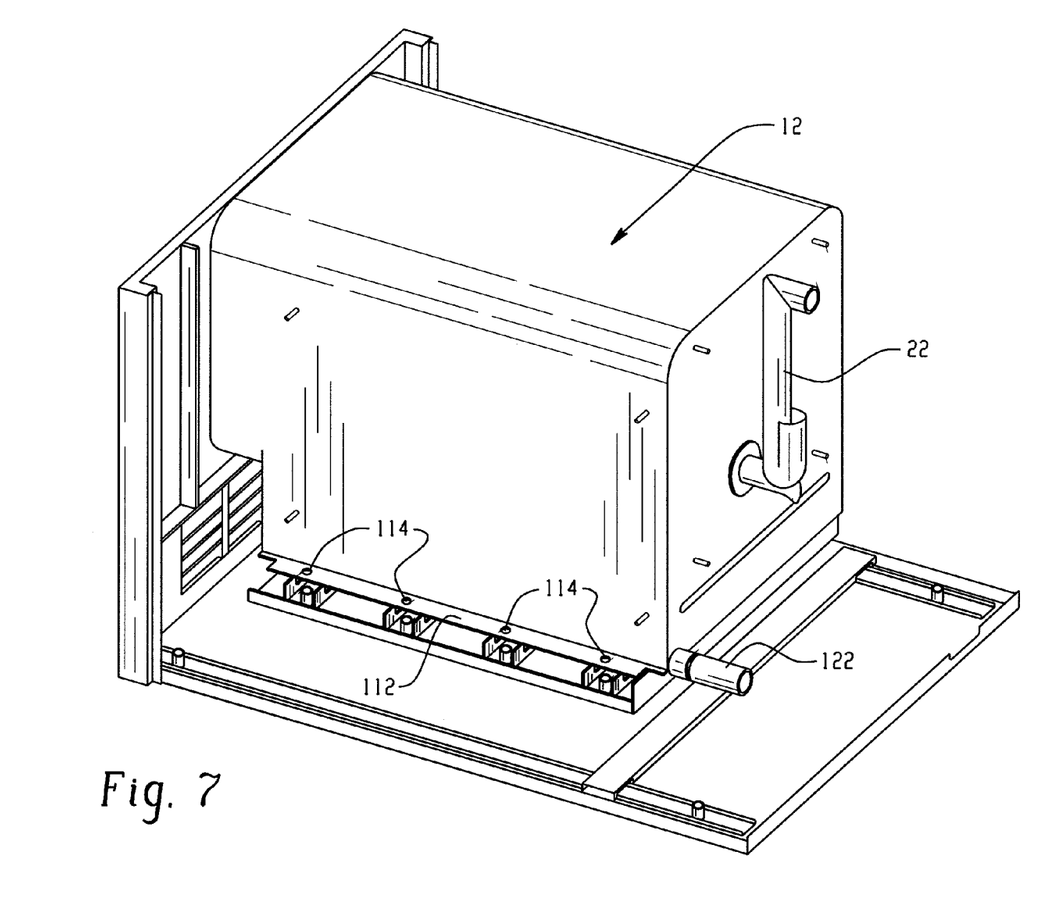
FIG. 7 is a partial perspective of the oven cavity showing a fastener side of the heater plate mount arrangement.

As shown in FIG. 4, the spring units are mounted within tray member 28 with mount arms 42 located at one side of the tray and mount bosses 46 located at the opposite side of the tray. The tray member includes a bottom wall 100, an upwardly turned side flange 102, an upwardly turned side flange 104 with a lateral flange part 106 and an upwardly turned side flange 108. The spring units may be secured to the tray member by sheet metal screws or other suitable means, and insulation may be sandwiched between the spring units and the bottom wall of the tray member. The heater plate 24 is positioned in the tray member atop the spring units 30. As seen in FIG. 5 (where the tray member is not shown) the mount arms 42 engage with a peripheral lip structure 110 at one side of the oven cavity in a manner that permits the spring units (and associated tray member) to pivot about the peripheral lip 110 to swing the opposite side of the mount arrangement toward or away from the cavity. A peripheral lip structure 112 (FIG. 6) at the opposite side of the cavity includes holes 114 that align with the mount openings 47, enabling a bolt or other fastener to be used to hold the tray member and spring units in an upward, assembled position. Stepped portions 54 on the channels may be sized to define an upward pivot limit of the tray member and spring units to assure that the spring members maintain sufficient pressure or upward bias of the heater plate while still allowing for expansion and contraction of the plate. By removing the fasteners that engage the holes 52 and mount openings 47 the tray member and spring units can be pivoted downward to enable simple removal/replacement of the heater plate 24 if necessary.

Figure 8:
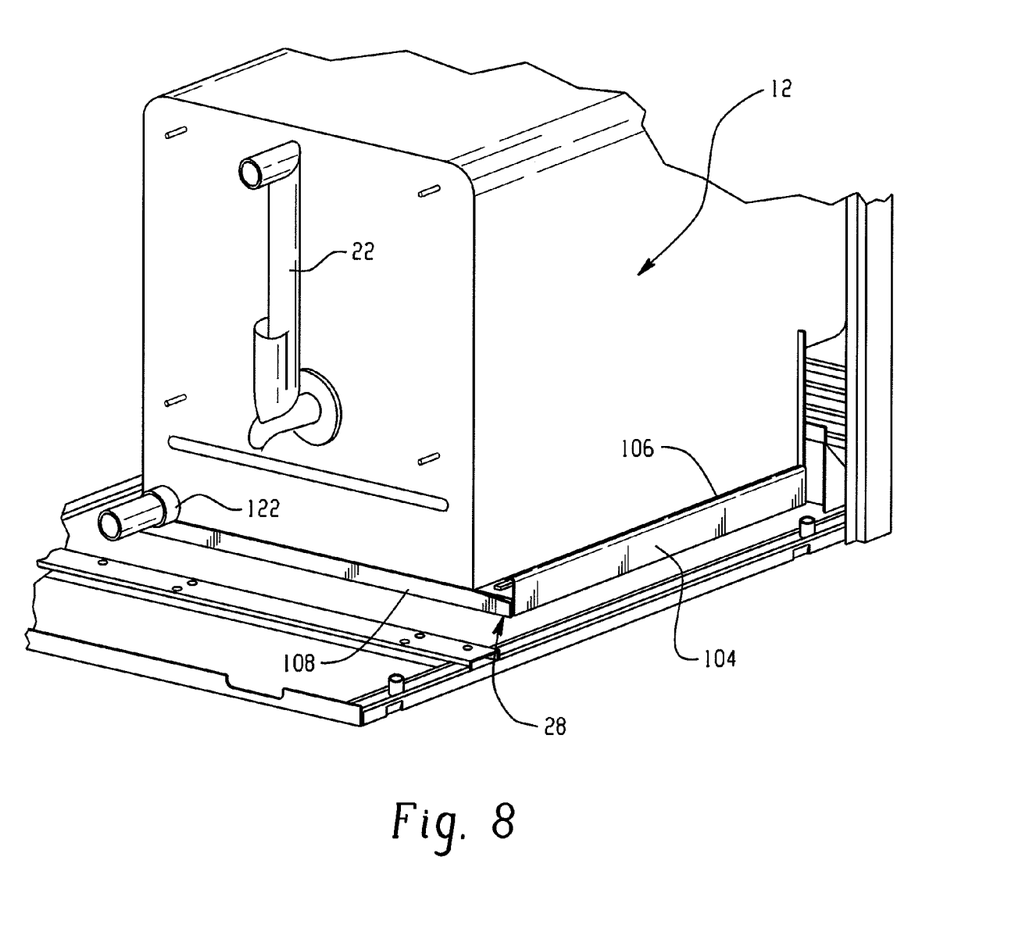
FIG. 8 is a partial perspective view according to FIG. 5 with the tray included.

FIG. 8 provides a perspective view comparable to FIG. 5, but with the tray member 28 included in the assembly, portions 104, 106 and 108 of the tray member being visible. Notably, the lateral flange 106 extends over and covers the mount arms of the spring assemblies.

Figure 9:
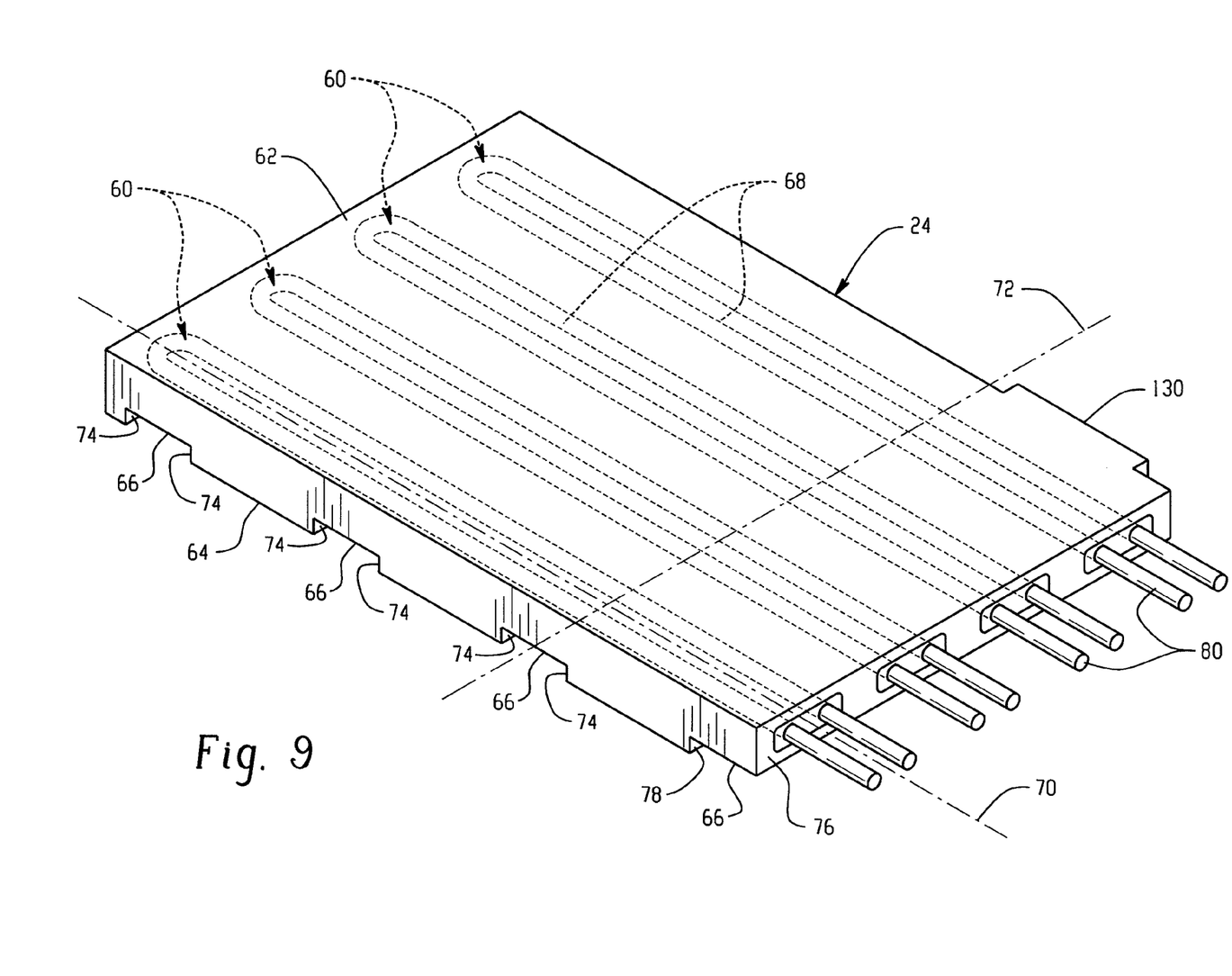
FIG. 9 is a perspective view of a heater plate with recesses.
Figure 10:
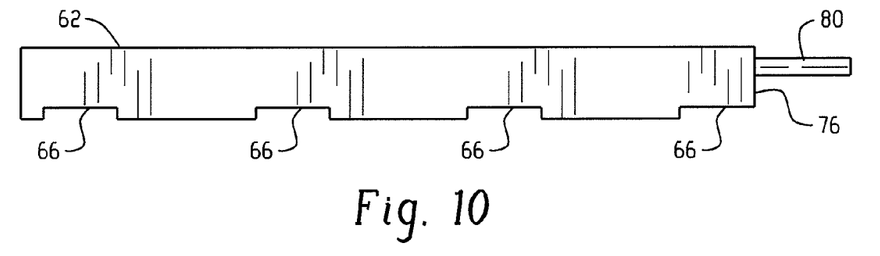
FIG. 10 is an elevation view of the heater plate of FIG. 9.
Figure 11:
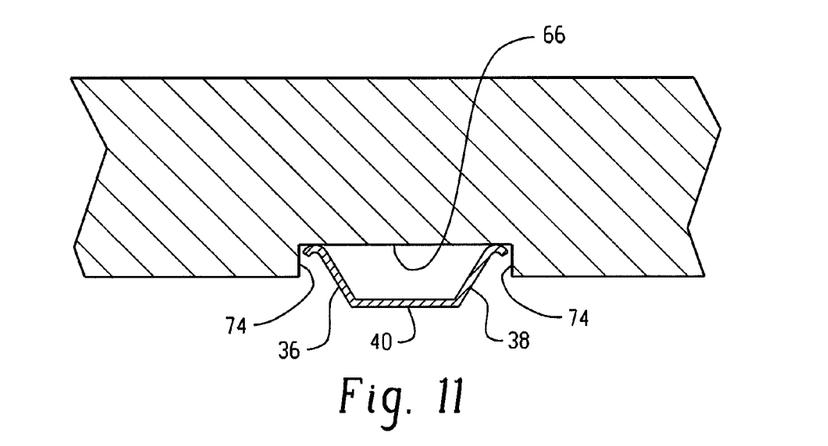
FIG. 11 is a partial cross-section showing interaction between the heater plate recesses and spring members.

As seen in FIGS. 9-11, in one implementation the heater plate 24 is configured to mate with the spring units 30 of the mount arrangement. In this regard, the plate 24 has a plurality of resistive heating elements 60 embedded therein. Four elements 60 are shown in the illustrated embodiment, but the number could vary (e.g., from 1 to 10 or more). An upper surface 62 of the plate is substantially planar and a bottom surface 64 has a plurality of recesses 66. The resistive heating elements have primary segments 68 with lengthwise axes 70 that extend substantially perpendicular to lengthwise axes 72 of the recesses 66. In the illustrated embodiment, three of the recesses are intermediate recesses, configured with opposite side edges 74, and one is a peripheral recess, configured along a peripheral edge 76 of the plate and having only a single side edge 78 that is spaced apart from the peripheral edge 76. Lead wires 80 of the resistive heating elements extend from the peripheral edge 76 of the plate. The illustrated heater plate 24 includes a rectangular-shaped protruding part 130 along one edge, which part 130 can include threaded holes to facilitate mounting of a temperature probe (not shown) that can be used as a high limit cutoff that turns off the elements 60 if the temperature exceeds a set level.

As shown in the partial cross-section of FIG. 11, the arms 36 and 38 of the spring-members may be sized to fit within the recesses 36 so that the arms contact the upper side of the recesses. Interaction between the arms and the side edges 74 of the recesses limits excessive lateral movement of the plate, while at the same time allowing for expansion and contraction of the plate.

In one implementation, when the heater plate mount is in the assembled position, the heater plate is biased upward but the spring members permit vertical movement of between about $\frac{1}{64}$ and $\frac{1}{16}$ of an inch (e.g., about $\frac{1}{32}$ of an inch) and the spring members interact with the recesses on the plate to limit the lateral movement of the plate to between about $\frac{1}{32}$ to $\frac{1}{8}$ of an inch.

Figure 12:
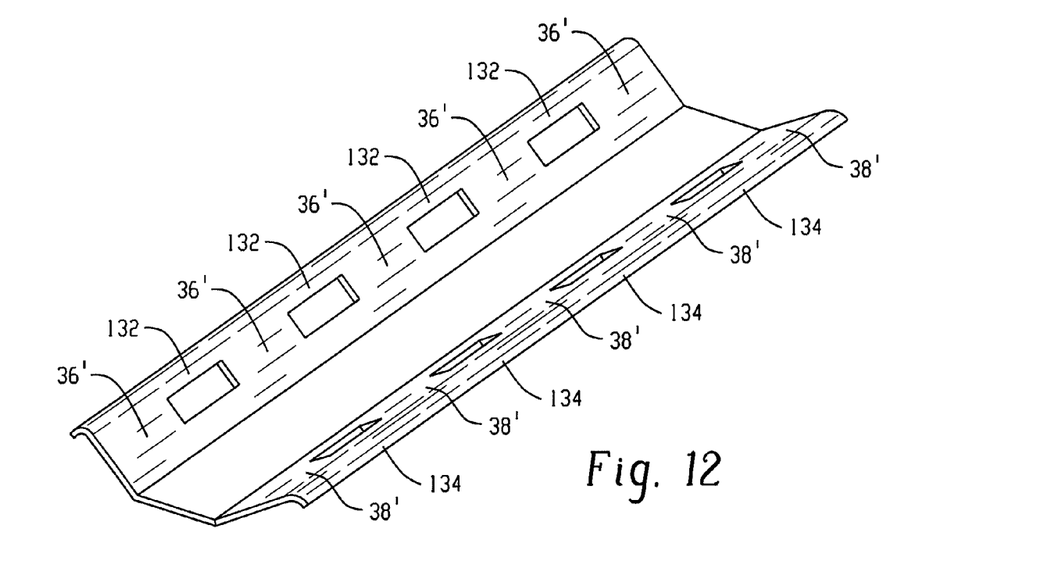
FIG. 12 shows an alternative embodiment of a spring member for placement in the spring unit bracket.

It is to be clearly understood that the above description is intended by way of illustration and example only, is not intended to be taken by way of limitation, and that other changes and modifications are possible. For example, while the spring units shown and described herein are elongated channels with leaf-sprint type members, other configurations of spring units could be used, such as simple coil-type springs, in which case the bottom surface of the plate could be formed with circular or annular recesses. Moreover, in one embodiment shown in FIG. 12, the leaf-spring type members could have the arms 36' and 38' connected along the length of the leaf-spring members by interconnecting structures 132 and 134 respectively. This arrangement provides continuous and smooth top edges on the leaf-spring member to facilitate ease of sliding relative to the bottom surface of the heater plate. This member could also be formed as a unitary piece.

What is claimed is:
1. A steam oven, comprising:
a cooking cavity for receiving food product;
a water reservoir for receiving water to be heated to generate steam, the water reservoir defined in part by a bottom wall structure of the cooking cavity;
a heater plate adjacent the bottom wall structure for delivering heat through the bottom wall structure to water in the water reservoir;
a spring-loaded heater plate mount arrangement supporting the heater plate adjacent the bottom wall structure while permitting some movement of the heater plate;
wherein the spring-loaded heater plate mount arrangement includes a tray member having multiple spring units positioned therein and engaged with the heater plate.
2. The steam oven of claim 1, wherein:
the tray member is pivotably mounted at a first side for movement relative to the bottom wall structure.
3. The steam oven of claim 1, wherein:
each spring unit is formed by an elongated channel member with at least one spring member located therein.
4. The steam oven of claim 3, wherein:
each spring member is a leaf spring-type member with spaced apart arms.
5. The steam oven of claim 4, wherein:
multiple spring members are located along a length of each channel member.
6. The steam oven of claim 5, wherein:
a lower surface of the heater plate includes multiple recesses formed therein, each channel aligned with a corresponding spring unit.

7. The steam oven of claim 6, wherein:

at least one of the multiple of the recesses includes opposite edges that are spaced apart by a distance that is larger than a distance between ends of spaced apart arms.

8. The steam oven of claim 2, wherein:

a second opposite side of the tray member is secured to the cooking cavity by at least one removable fastener.

9. The steam oven of claim 8, wherein:

the tray member includes structure that defines a spacing that sets a pressure exerted by the spring units on the heater plate.

10. The steam oven of claim 1 wherein the heater plate is external of the cavity and has an upper surface adjacent a lower surface of the bottom wall structure.

* * * * *